United States Patent
Peng et al.

(10) Patent No.: US 8,292,182 B1
(45) Date of Patent: Oct. 23, 2012

(54) PROCESS FOR READING BARCODES ON CYLINDRICAL ELEMENTS AND SYSTEM THEREFOR

(75) Inventors: Ying-Sung Peng, Hsinchu (TW); Yen-Chih Lin, Hsinchu (TW); Chin-Lung Han, Sinfong Township, Hsinchu County (TW)

(73) Assignee: Mas Automation Corp., Hsinchu (TW)

( * ) Notice: Subject to any disclaimer, the term of this patent is extended or adjusted under 35 U.S.C. 154(b) by 39 days.

(21) Appl. No.: 13/153,502

(22) Filed: Jun. 6, 2011

(30) Foreign Application Priority Data

Mar. 4, 2011 (TW) .............................. 100107259 A

(51) Int. Cl.
*G06K 7/10* (2006.01)

(52) U.S. Cl. ................... 235/462.14; 235/385; 235/454; 235/462.01; 235/462.08; 235/483

(58) Field of Classification Search .................. 235/385, 235/454, 462.01, 462.08, 462.14, 483
See application file for complete search history.

(56) References Cited

U.S. PATENT DOCUMENTS

2010/0292829 A1* 11/2010 Guzman et al. ............... 700/213

FOREIGN PATENT DOCUMENTS

| CN | 200944131 Y | 9/2007 |
| CN | 200962137 Y | 10/2007 |
| TW | 201010160 A1 | 3/2010 |
| TW | 201010161 A1 | 3/2010 |

* cited by examiner

*Primary Examiner* — Kristy A Haupt
(74) *Attorney, Agent, or Firm* — Chun-Ming Shih

(57) ABSTRACT

In a process for reading the barcodes on the cylindrical elements and a system therefor, the system includes a working table having a transferring path and an inspection area on the transferring path, a shifting means driving a plurality of the standing cylindrical elements to gradually move along transferring path into the inspection area, an element barcode adhered on the outer all of the cylindrical element, a transmission means driving the cylindrical elements to self-rotate a certain rotation angle, an element reader reading the barcodes of the self-rotating cylindrical elements in order to automatically identify and record the information of the cylindrical elements entering into the inspection area.

16 Claims, 9 Drawing Sheets

PROCESS FOR READING BARCODES ON CYLINDRICAL ELEMENTS AND SYSTEM THEREFOR

BACKGROUND

1. Technical Field

The present invention relates to a process for reading the barcodes on cylindrical elements and particularly to a process for reading the barcodes of self-rotating cylindrical elements, and more particularly to a process for reading the barcodes of elements after cylindrical elements are captured to a certain height and self-rotated, which also involves a process to read the carrying-tray barcode of a carrying tray. The present invention also relates to an apparatus for reading the barcodes. The cylindrical elements include batteries.

2. Related Art

Currently, during manufacturing the assembly parts of the electronic, optical-electrical and mechanic products, it is commonly to adhere a barcode on the surfaces of the part for identification. The barcodes are read by manually using barcode readers for recording information of the elements. The part which is adhered with barcode is commonly in a form of block or cylindrical shape, such as a battery. Taiwan Patent Application Publication Nos. 201010160 and 201010161 describe a plurality of block batteries disposed on a transfer apparatus (a carrier jig or named as carrying tray), barcodes are adhered to the batteries and the information thereon are read and recorded by a reader. The details of the technology for reading the barcodes are not disclosed. China Patent Application Publication No. 200620063148 discloses a test process by reading barcodes to record the information of a plurality of cylindrical batteries and the position thereof. However, the process describes in this CN patent application relies on manually operating the reader to scan and record the barcode information of the cylindrical batteries one by one. When operating the process describes in the CN patent application, it is inconvenient to scan the barcodes and easy to result in reading error on the barcode information. Moreover, China Patent Application Publication No. 20062006634 describes a process improving the manually operation of the reader to scan the barcodes one by one. This CN patent application teaches an improvement on the manually operation of the readers to scan the barcodes. It is taught that a reader is disposed on a rail by manually moving or electromechanic driving the reader both in perpendicular and horizontal directions to scan the barcodes on the plurality of cylindrical batteries arranged on a rack. However, because the barcode is adhered on the arc or cylindrical surface of the cylindrical element, the length of barcode is in a certain range of the cylindrical surface thereof. Thus, merely by moving the readers without manually or other manner to rotate the cylindrical battery, the reader is unable to correctly scan the barcodes on the arc or cylindrical surfaces. It is apparent to result in incomplete scanning or reading errors. Furthermore, the barcodes which are not adhered on the same position of the arc or cylindrical surfaces will result in an ineffective reading by the reader.

BRIEF SUMMARY

The present invention provides a process for reading the barcodes on a plurality of cylindrical elements, wherein the barcodes rotate with the cylindrical elements in the scanning area of a reader in order for the reader to completely read the barcodes. The process of the present invention can overcome the problem in the prior arts that the reader cannot effectively scan the barcodes on the surface of the cylindrical elements merely by moving the reader.

The present invention also provides a system for reading the barcodes on a plurality of cylindrical elements, which facilitates the barcodes on the cylindrical elements to be automatically scanned and further read the information of the barcodes by the reader in the scanning area. In addition, the reader of the present invention is fixed in position.

For achieving the above mentioned purpose and solving the problems in prior art, the present invention provides a process comprising:

arranging a transferring path on a working table, and an inspection area on the transferring path;

utilizing a shifting means to drive a plurality of standing cylindrical elements along the transferring path gradually to enter into the inspection area, wherein the outer walls of the cylindrical elements are adhered with element barcodes;

utilizing a transmission means to drive the cylindrical elements entered into the inspection area to self-rotate a certain rotation angle; and utilizing an element reader to read the element barcodes on the self-rotated cylindrical elements to identify and record the information of the cylindrical elements entered into the inspection area.

Accordingly, the cylindrical elements with the element barcodes can be rotated a certain angle in the scanning area of the element reader and are read by the element reader during rotating, such that the element reader can completely read the information of the element barcodes. Thus, the process of the present invention can overcome the problem in the prior arts that the reader cannot effectively scan the bard codes on the surface of the cylindrical elements merely by moving the reader.

The system for performing the process in accordance with the present invention comprises:

a working table having a transferring path and an inspection area on the transferring path;

a shifting means installed on the working table, which drives a plurality of standing cylindrical elements to gradually move along transferring path into the inspection area, element barcodes are adhered on the outer walls of the cylindrical elements;

a capturing means mounted above the inspection area to capture the cylindrical elements entered into the inspection area to a certain height;

a transmission means disposed in the inspection area and coupled to the capturing means, which drives the cylindrical elements held by the capturing means at the certain height to self-rotate a certain rotation angle; and an element reader mounting in the inspection area, which reads the barcodes of the self-rotating cylindrical elements in order to identify and record the information of the cylindrical elements entered into the inspection area, wherein after the element reader reads the barcodes, the capturing means transfer the cylindrical elements from the certain height downwardly to the original position.

Accordingly, the system of the present invention facilitates the barcodes on the cylindrical elements to be automatically scanned by an element reader so as to automatically read the information of the barcodes.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
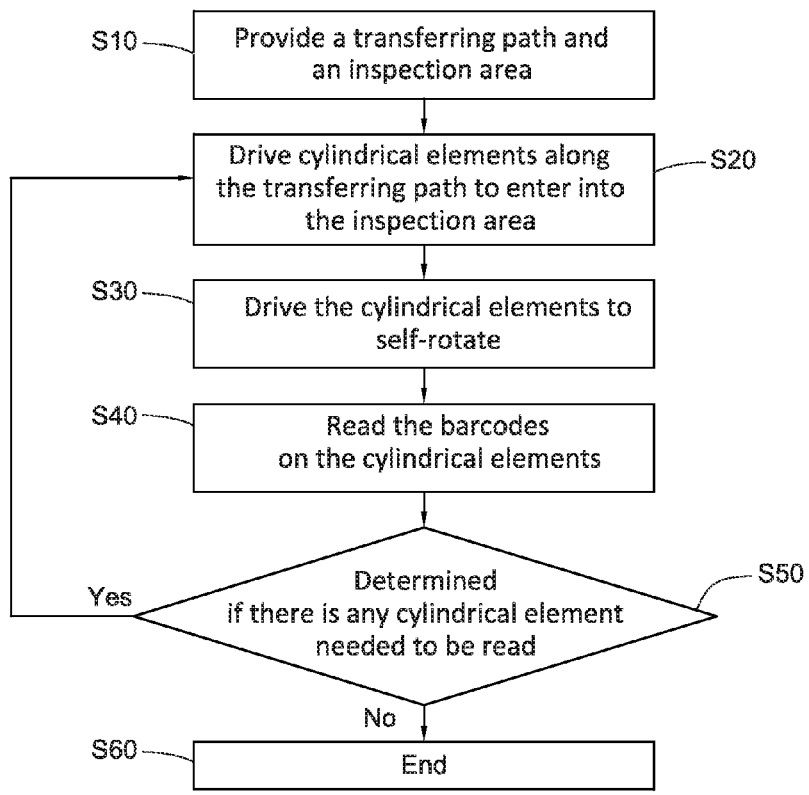
FIG. 1 is a flow chart of the first embodiment of the process in accordance with the present invention.
Figure 2A:
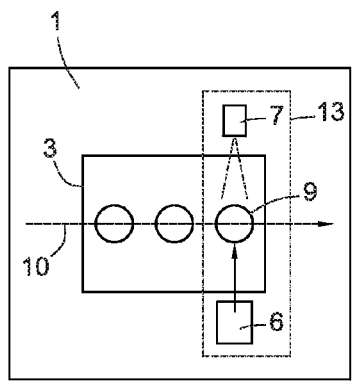
FIG. 2a is a perspective view showing the arrangement in according with the embodiment of the present invention shown in FIG. 1.
Figure 5:
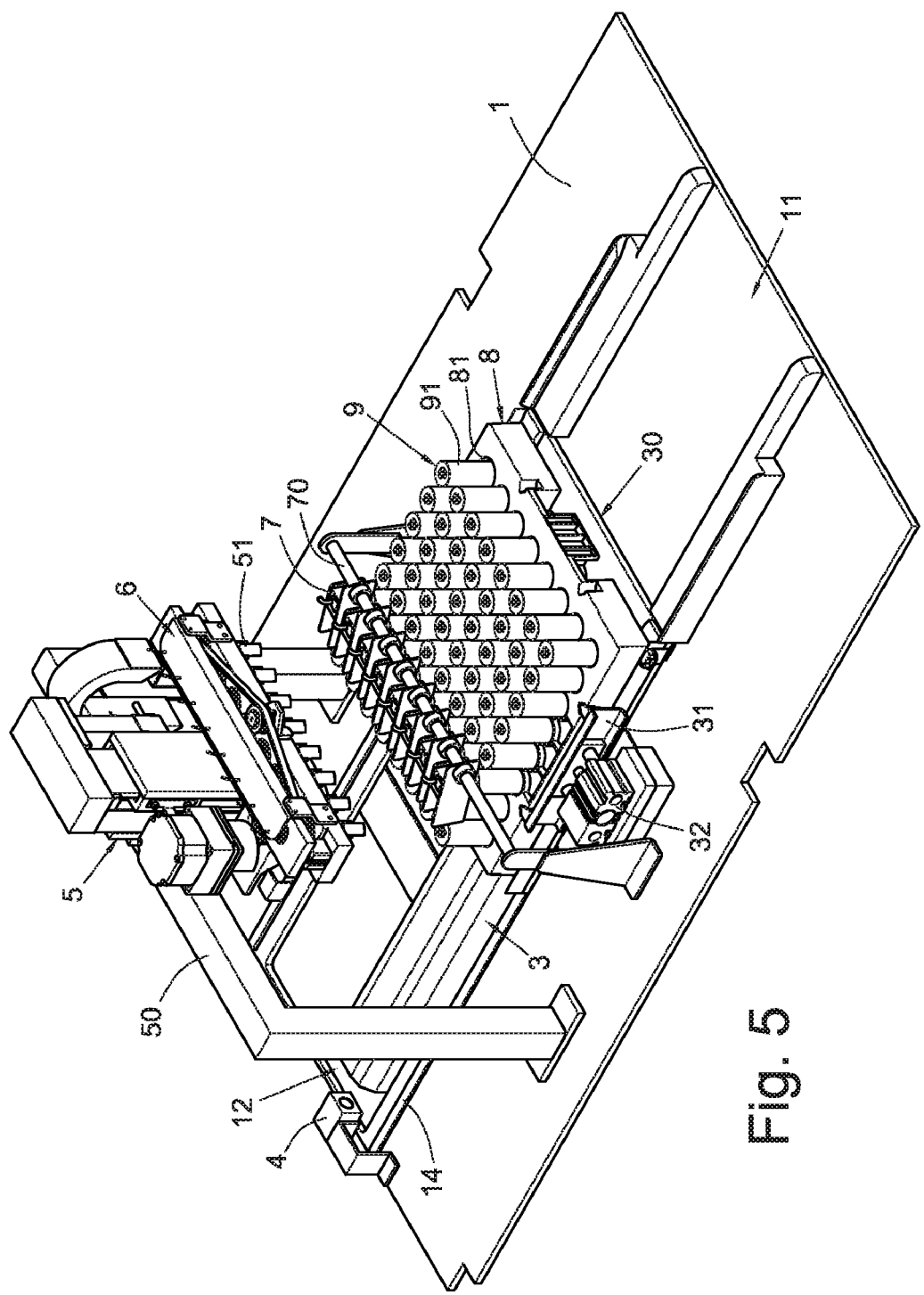
FIG. 5 is a perspective view showing the second embodiment of the system in accordance with the present invention.

In FIG. 1, a flow chart of the process of a first embodiment of the present invention illustrating in company with FIG. 2a and FIG. 5, is to illustrate the process of the present invention which reads the barcodes of a plurality of cylindrical elements, which comprises the following steps.

Figure 6:
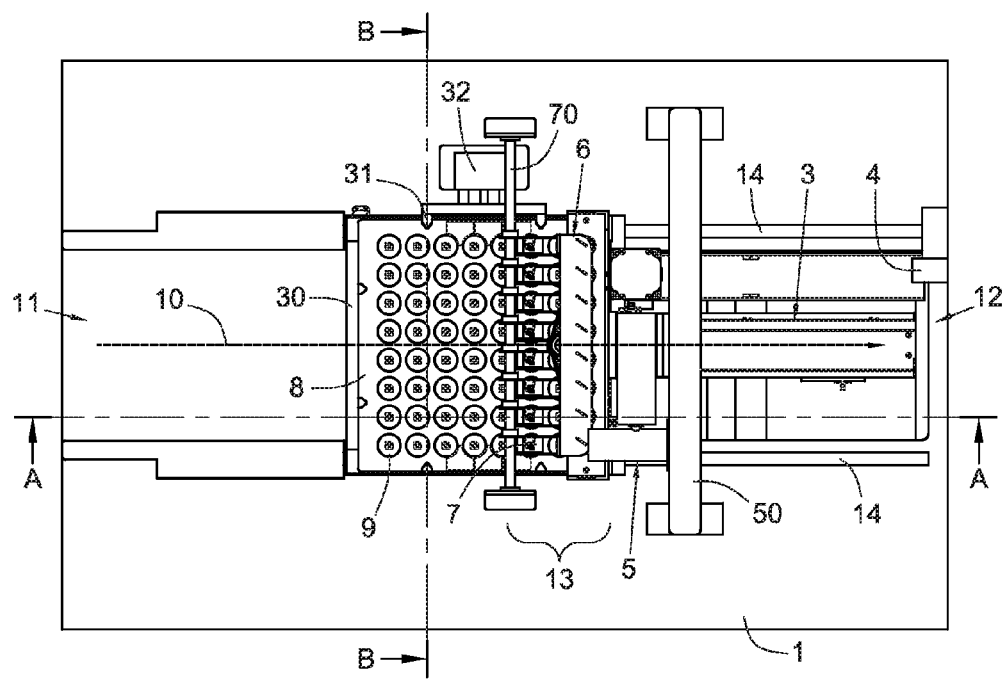
FIG. 6 is a top view of the system of the FIG. 5.
Figure 7:
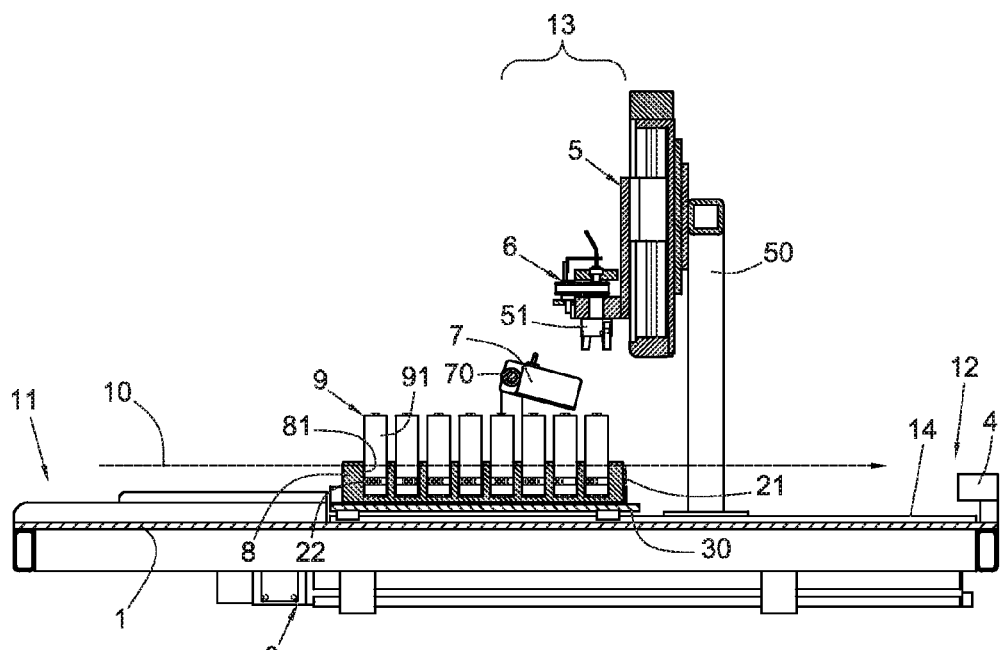
FIG. 7 is the cross-sectional view of the system along the line A-A of FIG. 6.

In step S10, a working table 1 is arranged a linear transferring path 10 (as shown in FIG. 6 and FIG. 7) and an inspection area 13 on the transferring path 10.

In step S20, a shifting means 3 is disposed on the working table 1 (as shown in FIG. 6 and FIG. 7). The shifting means 3 comprises a motor and a conveying belt, a plurality of rollers and a screw rod driven by the motor. The shifting means 3 is used to drive the plurality of standing cylindrical elements 9 to be moved along the transferring path 10 into the inspection area 13. The cylindrical element 9 in the present embodiment is for example a battery. The outer wall of the cylindrical element 9 is an arc surface 91 and a barcode 22 is adhered thereon. The barcode 22 records the information of the cylindrical element 9, such as the part number, type, manufacture's name, manufacture date thereof and the like.

Figure 16:
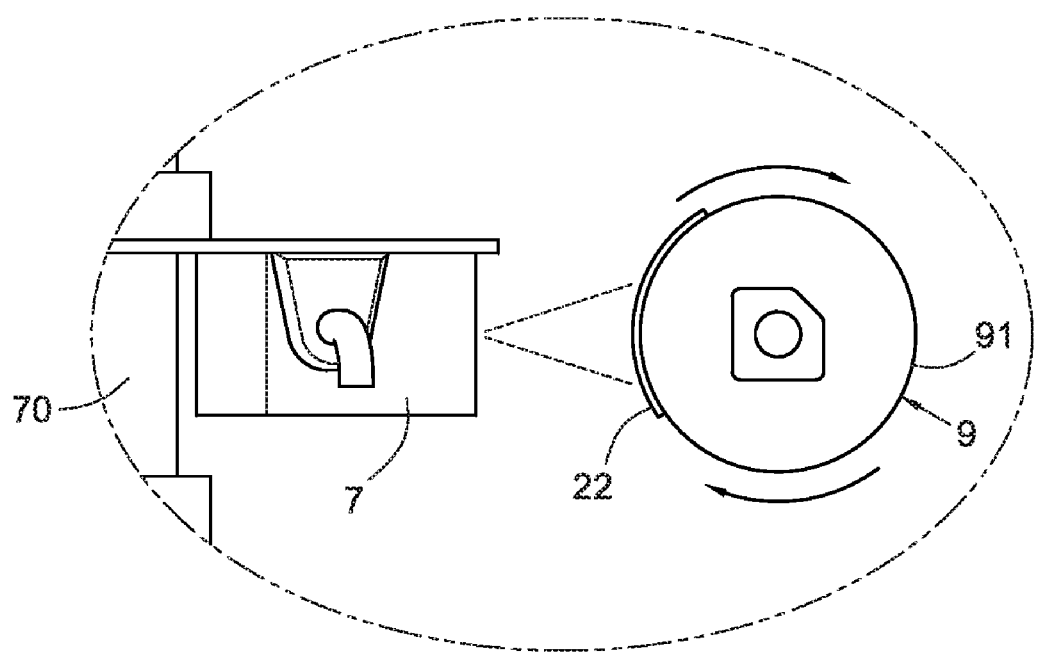
FIG. 16 is a perspective view of the arrangement between the element reader and the cylindrical elements of FIG. 7.

In step S30, a driver 6 is installed in the inspection area 13 (as shown in FIG. 6 and FIG. 7). The driver 6 comprises a motor and a belt driven by the motor. The cylindrical element 9 driven by driver 6 to be moved into the inspection area 13 is self-rotated a certain rotating angle (as shown in FIG. 16). The rotating angle is less than or equal to 720 degrees.

In step S40, an element reader 7 is installed in the inspection area 13 (as shown in FIG. 6 and FIG. 7). The element reader 7 is used to read the barcode 22 on the self-rotated cylindrical element 9. Because the cylindrical element 9 is self-rotated in a certain angle, the arc surface 91 of the cylindrical element 9 is successively passed the scanning area of the element reader 7 (as shown in FIG. 16), so that the element reader 7 completely reads the barcode 22 of the element and further identifies and records the information of the cylindrical element 9 entered into the inspection area 13. When the cylindrical element 9 rotates in an angle less than 720 degrees, the element reader 7 has completed the reading of the element barcodes 22. Thus, the certain rotating angle is less than 720 degrees.

Figure 14:
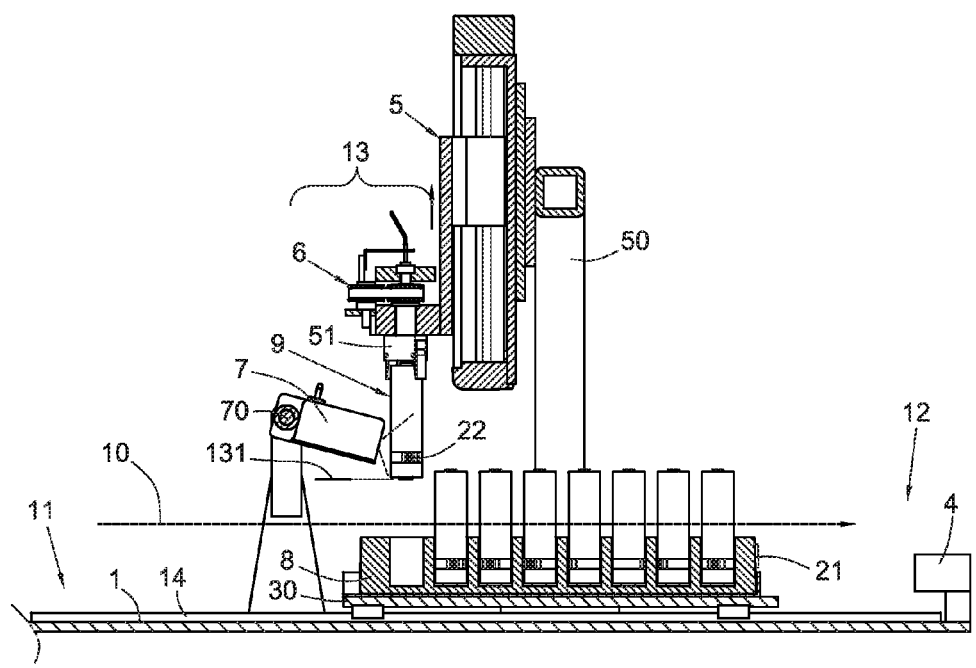
FIG. 14 is a perspective view of the system of FIG. 13 in another use state.

In step S50, it is determined if there is any cylindrical element 9 which is not read left on the transferring path 10. In this embodiment, a sensor (not shown) mounted on the working table 1 detects the transferring path 10 and the inspection area 13 to determine if there is any cylindrical element 9 not being read. When the sensor determines there is any cylindrical element 9 needed to be read (as shown in FIG. 14), repeat the step S20. When the sensor determines that there is no cylindrical element 9 needed to be read, conduct step S60. Thus, by repeating step S20 to step S50, the cylindrical element 9 enters into the inspection area 13, the element barcode 22 on the cylindrical element 9 is read and recoded one by one.

Figure 15:
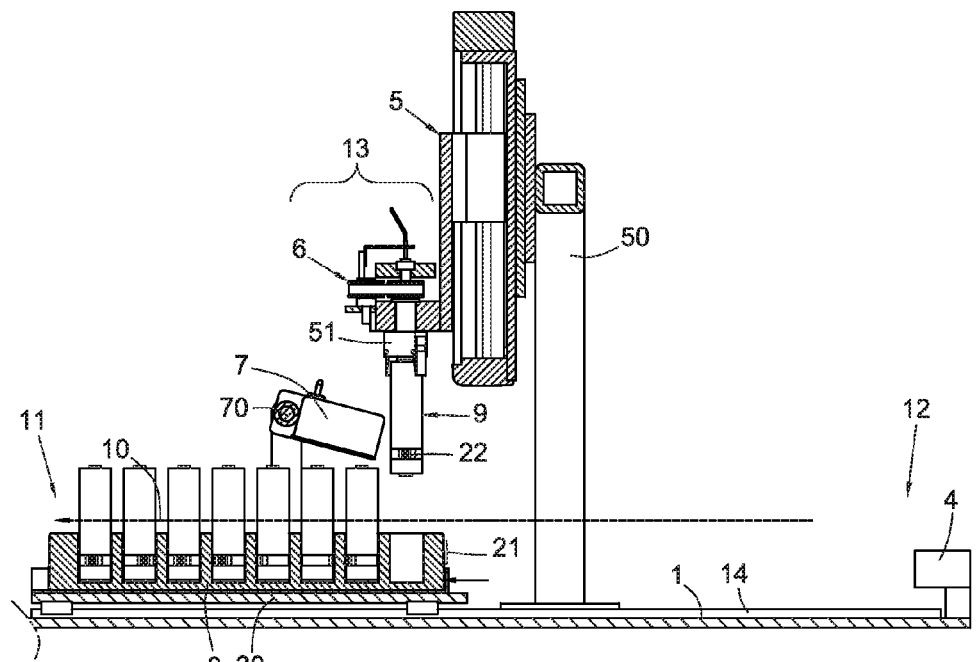
FIG. 15 is a perspective view of the system of FIG. 7 in still another use state.

In step S60, the shifting means 3 is stopped driving the cylindrical element 9 (as shown in FIG. 15) to end the operation.

Figure 3:
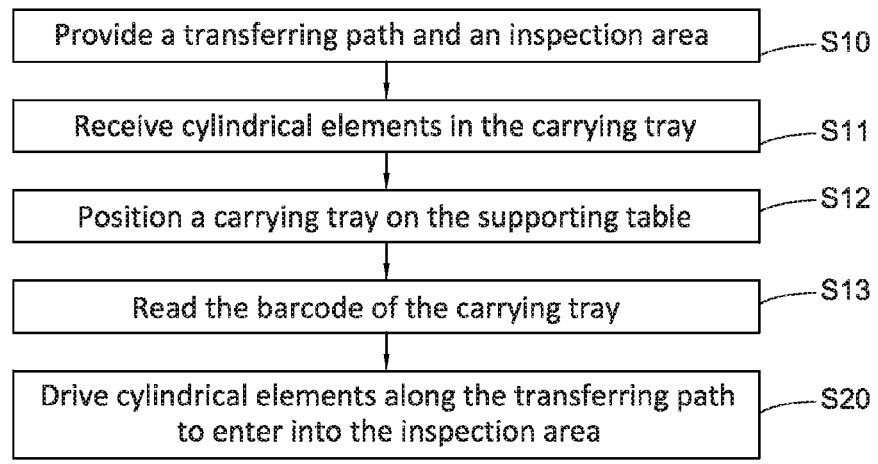
FIG. 3 is a flow chart of another embodiment of the process in according with the embodiment of the present invention shown in FIG. 1.
Figure 8:
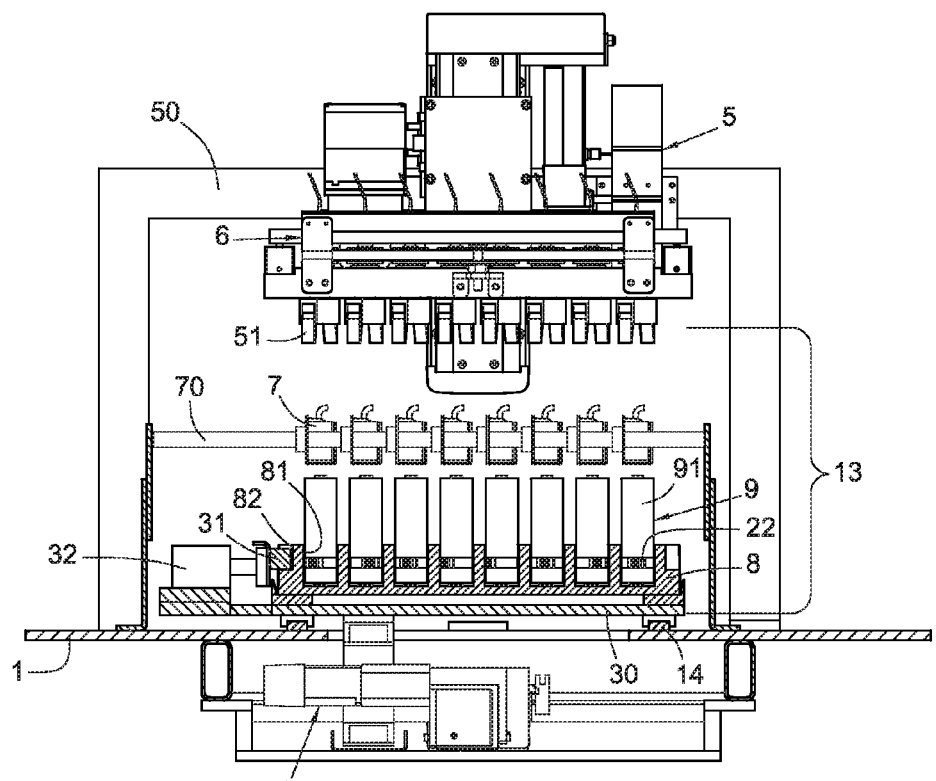
FIG. 8 is the cross-sectional view of the system along the line B-B of FIG. 6.
Figure 9:
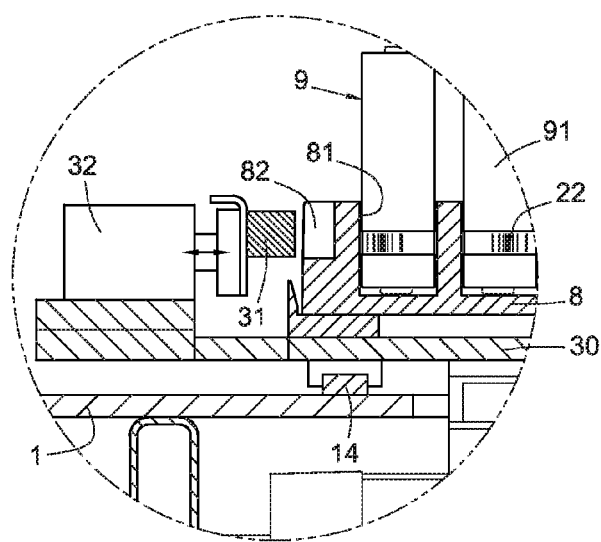
FIG. 9 is a partial-enlarged view of the system of FIG. 8.
Figure 11:
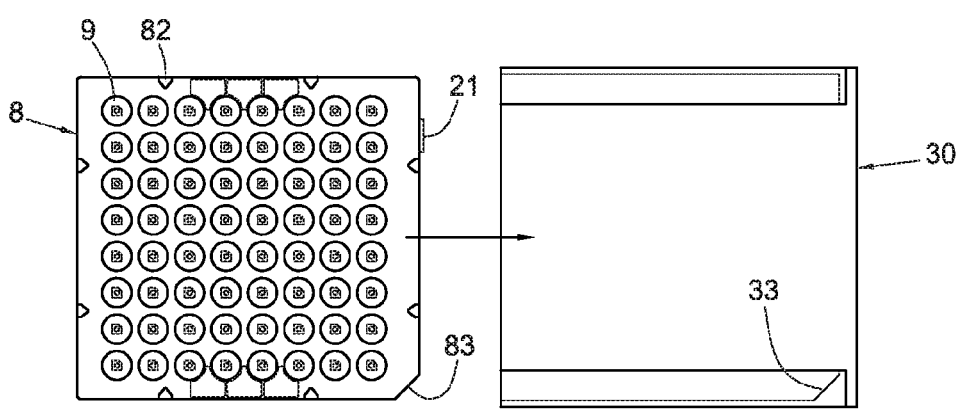
FIG. 11 is a perspective view of the carrying tray and the supporting table of FIG. 10 in use state.

In a further embodiment, the present process further comprises the following steps between step S10 and step S20 (as shown in FIG. 3):

In step S11, taking a carrying tray 8 (as shown in FIG. 11), the carrying-tray barcode 21 is adhered at the side wall of the carrying tray 8. The carrying-tray barcode 21 encodes the information for identification. The carrying tray 8 has a plurality of receiving holes 81 axially spatially arranged along the transferring path 10 (as shown in FIG. 8 and FIG. 9). The cylindrical elements 9 are retained upwardly in the receiving holes 81 of the carrying tray 8, respectively, so that the cylindrical elements 9 on the carrying tray 8 are axially spatially arranged along the transferring path 10. The side wall of the carrying tray 8 comprises a slot 82 for positioning.

Figure 10:
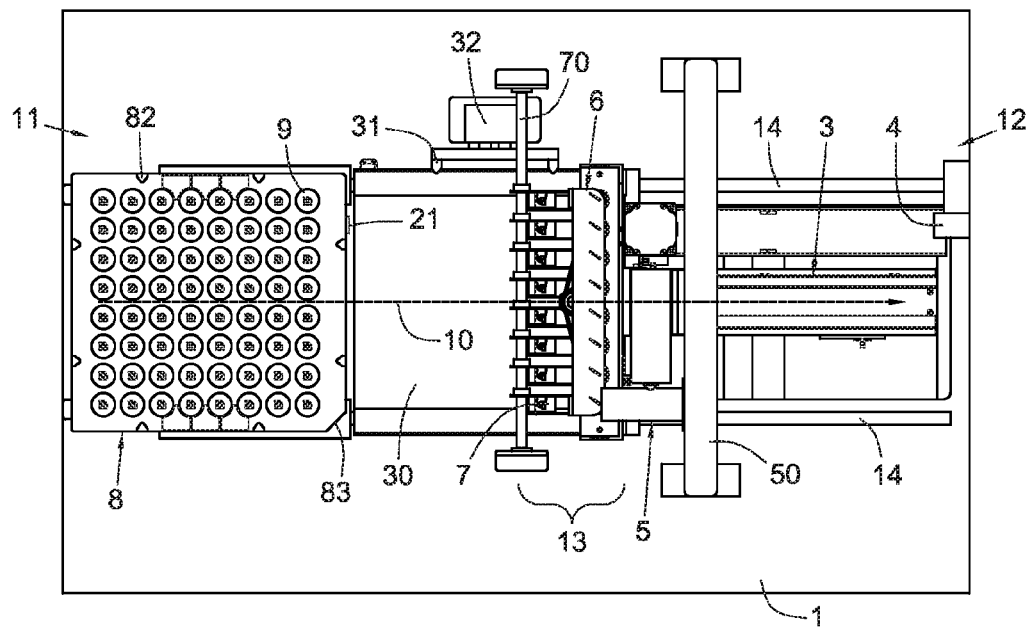
FIG. 10 is a perspective view of the system of FIG. 6 in a use state.

In step S12, the shifting means 3 provides a supporting table 30 which can be moved along the transferring path 10 (as shown in FIG. 6 and FIG. 7). The two ends of the working table 1 are the first end 11 and the second end 22 of the transferring path 10. The inspection area 13 is positioned between the first end 11 and the second end 12. Two rails 14 are installed on the working table 1 along the transferring path 10. The two sides of the supporting table 30 are mounted on the rail 14 to be guided by the rail 14. The carrying tray 8 can move into the transferring path 10 from the first end 11 (as shown in FIG. 10) to be dispose on the supporting table 30, and the carrying tray barcode 21 of the carrying tray 8 is faced to the second end 12. A retractable engagement claw 31 is at one side of the supporting table 30 for engaging into slot 82 (as shown in FIG. 8A and FIG. 9) in order to position the carrying tray 8.

Figure 12:
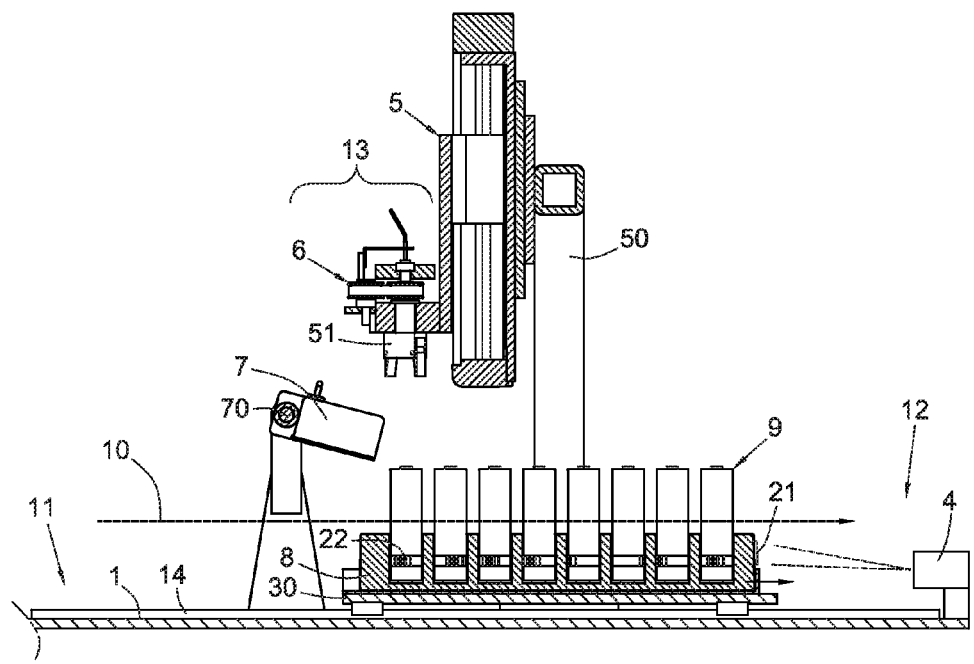
FIG. 12 is a perspective view of the system of FIG. 7 in another use state.

In step S13, the shifting means 3 shifts the supporting table 30 to transfer the carrying tray 8 moved from the first end 11 along the transferring path 10 to the second end 12 (as shown in FIG. 7 and FIG. 12). A carrying-tray reader 4 at the second end 12 of the transferring path 10 is used to read the carrying-tray barcode 21 of the carrying tray 8 on the transferring path 10 to identify and record the information of the carrying tray 8 on the transferring path 10.

After the step S20, the shifting means 3 is used to shift the supporting table 30 to carry the carrying tray 8 moving from the second end 12 along the transferring path 10 to the first end 11 (as shown in FIG. 15), so that the supporting table 30 is driven along the transferring path 10 gradually into the inspection area 13. Thus, the cylindrical element 9 along the transferring path 10 gradually enters into the inspection area 13 and is moved from the inspection area 13 toward the first end 11.

Figure 4:
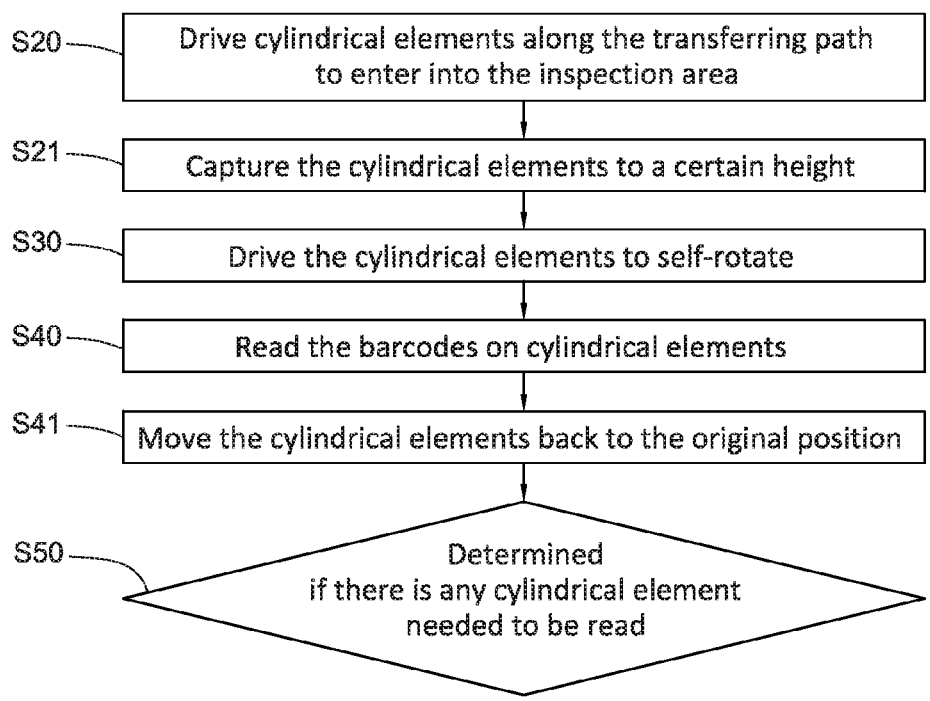
FIG. 4 is a flow chart of still another embodiment of the process in according with the embodiment of the present invention shown in FIG. 1.

In another embodiment of the process in accordance with the present invention, the process further comprises the following steps between step S20 and step S50 (as shown in FIG. 4):

In step S21, a capturing means 5 is mounted on the top of the inspection area 13 (as shown in FIG. 6 to FIG. 8). The capturing means 5 provides a clamping means 51 which can be moved in a direction perpendicular to the transferring path 10. The capturing means 5 essentially comprises a motor, and a belt or a screw rod driven by the motor. When the cylindrical element 9 is moved toward the first end 11 to gradually pass the inspection area 13, the capturing means 5 drives the clamping means 51 to top-down capture the cylindrical element 9 which is entering into the inspection area 13 (as shown FIG. 12 and FIG. 13), and the cylindrical element 9 is moved toward the top of the inspection area 13 to a certain height 141 (as shown in FIG. 14).

Figure 13:
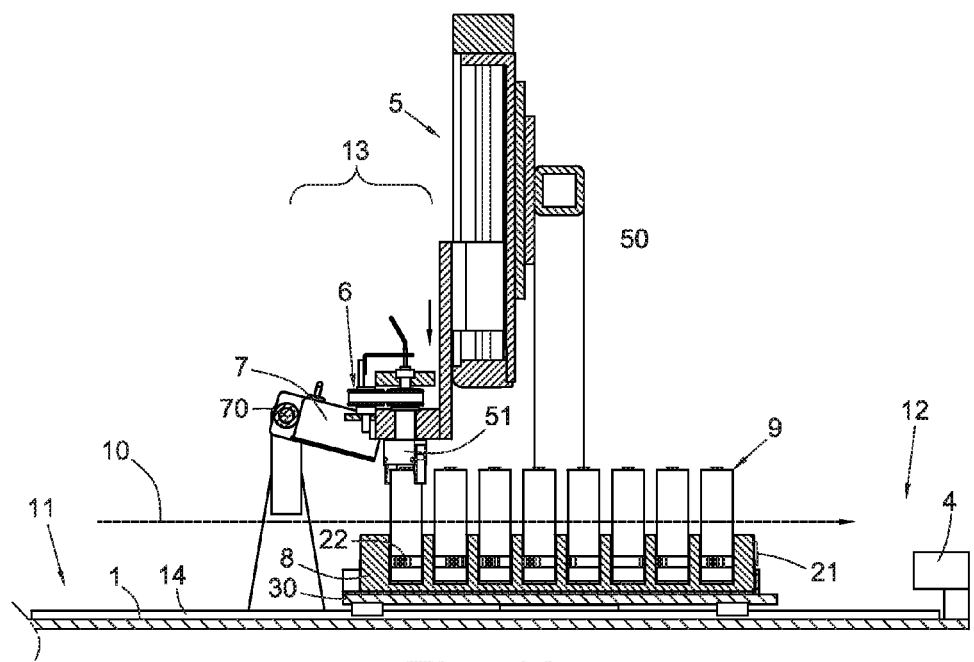
FIG. 13 is a perspective view of the system of FIG. 12 in another use state.

Then, after the step S30, a transmission means 6 is mounted on the top of the inspection area 13 (as shown in FIG. 6 to FIG. 8). The transmission means 6 is disposed on the clamping means 51 of the capturing means 5, which can be moved upwardly and downwardly with the clamping means 51 (as shown in FIG. 13). Thus, the transmission means 6 drives the clamping means 51 of the capturing means 5 at a certain height to clamp the cylindrical element 9 to self-rotate a certain angle (as shown in FIG. 15 and FIG. 16).

Thereafter, in step S40, an element reader 7 is mounted on the top of the inspection area 13 (as shown in FIG. 6 to FIG. 8) in order to avoid the element reader 7 interfering the movement of the cylindrical element 9 along the transferring path 10. The element reader 7 can read the element barcode 22 of the self-rotated cylindrical element 9 at a certain height.

In step S41, the capturing means 5 drives the clamping means 51 to transfer the cylindrical element 9 from the certain height 131 downwardly to the original position (as shown in FIG. 13); and conducts the step 50 thereafter.

Accordingly, the cylindrical element 9 can be rotated at a certain rotation angle in the scanning area for the element reader 7 reading the element barcode 22 during the rotation of the cylindrical element. Thus, the element reader 7 can read the element barcode 22 completely. Accordingly, the process of the present invention can overcome the problem in the prior arts that the reader cannot effectively scan the barcodes on the arc or cylindrical surfaces of the cylindrical elements merely by moving the reader and facilitates the barcodes 22 on the cylindrical elements 9 to be automatically read and record the information thereof. In addition, while the cylindrical element is a battery, the use of carrying tray 8 to retain the cylindrical element 9 for the above auto-identification of barcode is advantageously for the packing (binding) process of a battery pack.

Figure 2B:
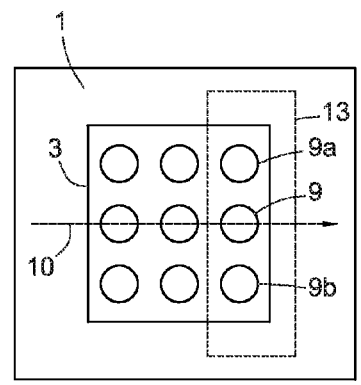
FIG. 2b is a perspective view showing another embodiment of the arrangement in according with the embodiment of the present invention shown in FIG. 1.

Furthermore, the clamping means 51 and the element reader 7 of the system in accordance with the present invention can be used several sets and operated simultaneously (as shown in FIG. 5 to FIG. 8). The capturing means 5 can drive the clamping means 51 to be moved at the same time (as shown in FIG. 13). The transmission means 6 can drive the clamping means 51 to self-rotate simultaneously. The carrying tray 8 can also comprise a plurality of sets of the receiving holes 81 which are operated simultaneously (as shown in FIG. 11). The plurality of sets of the receiving holes 81 are in a matrix arrangement in order for the cylindrical elements 9 to be also in a matrix arrangement. Thus, the cylindrical elements 9, 9*a*, 9*b* which are in the same row can enter into the inspection area 13 together along the transferring path 10 to be scanned by the element reader 7 (as shown in FIG. 2*b*).

Now referring to FIG. 5 in company with FIG. 6 to FIG. 8, FIG. 5 shows the perspective view of the second embodiment of the system for reading the barcodes on a plurality of cylindrical elements in accordance with the present invention. The present system comprises a working table 1, a shifting means 3, a capturing means 5, a transmission means 6 and an element reader 7. The working table 1 is installed a linear transferring path 10 and an inspection area 13 on the transferring path 10. A carrying-tray reader 4 is installed on the transferring path 10. A shifting means 3 is disposed on the working table 1. The shifting means 3 has a supporting table 30 on the top of the working table 1. A retractable engagement claw 31 is disposed on the side of the supporting table 30 (as shown in FIG. 9). The engagement claw 31 is typically driven by a cylinder 32 disposed at the side of the supporting table 30 to act the retraction action.

A carrying tray 8 is disposed on the supporting table 30 (as shown in FIG. 10 and FIG. 11), and a plurality of standing cylindrical elements 9 are received in the carrying tray 8. The side of the carrying tray 8 is adhered a carrying-tray barcode 21. The carrying-tray reader 4 can read the carrying-tray barcode 21 of the carrying tray 8 (as shown in FIG. 12) and identify and record the information of the carrying tray 8 on the transferring path 10. More than one slots 82 are disposed at one end of the carrying tray. The out wall of the cylindrical element 9 is as an arc surface 91. An element barcode 22 is adhered on the arc surface 91. The engagement claw 31 is engaged into the slot 82 for positioning the carrying tray 8 in the supporting table 30. The shifting means 3 can drive the supporting table 30 to move the carrying tray 8 along the transferring path 10 (as shown in FIG. 15) in order for the cylindrical element 9 to enter the inspection area 13 gradually.

A support stand 50 is mounted above the transferring path 10 of the working table 1. The capturing means 5 is mounted on the support stand 50 and above the inspection area 13. The capturing means 5 can be moved upwardly and downwardly on the support stand 50 (as shown in FIG. 13) for capturing the cylindrical element 9 which enters into the inspection area 13 in order to move the cylindrical element 9 upwardly to a certain height 131 (as shown in FIG. 14). A transmission means 6 is coupled to the capturing means 5 and disposed above the inspection area 13. The transmission means 6 can drive the cylindrical element 9 held by the capturing means 5 at a certain height 131 to self-rotate a certain rotation angle (as shown in FIG. 16).

A support rod 70 is mounted above the transferring path 10 of the working table 1. The element reader 7 is mounted on the support rod 70 and above the inspection area 13 at a certain height 131. The element reader 7 can read the barcode 22 of the self-rotating cylindrical element 9 at a certain height 131 to identify and record the information of the cylindrical element 9 which enters into inspection area 13. After the element reader 7 reads the barcode 22, the capturing means 5 can transfer the cylindrical element 9 from the certain height 131 downwardly to the original position.

In addition, the carrying tray 8 and the supporting table 30 are constructed for fool-proof design. The fool-proof design is a safety design for preventing the assembly or operation errors. The fool-proof design comprises an inclined surface 83 formed at one side of the carrying tray 8 (as shown in FIG. 11) and a reverse inclined surface 33 formed at one side of the supporting table 30 to engage with the inclined surface 83. Thus, when the carrying tray 8 is positioned into the supporting table 30 in a right direction, the inclined surface 33 will engage with the inclined surface 83, such that the carrying tray 8 is positioned in the right position on the top of the supporting table 30. When the carrying tray 8 is positioned into the supporting table 30 in the wrong direction, the inclined surface 33 will block the outer wall of the carrying tray 8, such that the carrying tray 8 cannot be completely positioned on the top of the supporting table 30. Accordingly, the system of the present invention facilitates the barcodes 22 on the cylindrical elements 9 to be automatically scanned by the element reader 7 so as to automatically read the information of the barcodes. The other parts of the system and the process are the same as those of the first embodiment in accordance with the present invention.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A process for reading barcodes on a plurality of cylindrical elements, comprising:
    a transferring path arranged on the working table and an inspection area on the transferring path;
    utilizing a shifting means to drive a plurality of standing cylindrical elements along the transferring path gradually to enter into the inspection area, wherein outer walls of the cylindrical elements are adhered with element barcodes;
    utilizing a transmission means to drive the cylindrical elements entered into the inspection area to self-rotate a certain rotation angle; and
    utilizing an element reader to read the element barcodes on the self-rotated cylindrical elements to identify and record information of the cylindrical elements entered into the inspection area.

2. According to the process claimed in claim 1, further comprising a capturing means to capture the cylindrical elements in the inspection area to a certain height and the transmission means driving the capturing means to be rotated at the certain height in order to enable the cylindrical elements to be self-rotated, after the element reader reading the element barcodes, the capturing means moving the cylindrical elements from the certain height back to an original position.

3. According to the process claimed in claim 1, wherein the transferring path is in a linear form.

4. According to the process claimed in claim 1, wherein the outer wall of the cylindrical element is a cylindrical surface, and one barcode is adhered on the cylindrical surface.

5. According to the process claimed in claim 1, further comprising a carrying tray on which the cylindrical elements retain and the shifting means driving the carrying tray to be moved along the transferring path.

6. According to the process claimed in claim 5, wherein the carrying tray is adhered a carrying-tray barcode, a carrying tray reader disposed on the transferring path is used to read the carrying-tray barcode of the carrying tray to identify and record the information of the carrying tray on the transferring path.

7. According to the process claimed in claim 5, wherein the shifting means provides a supporting table which can be moved along the transferring path, the carrying tray is positioned on the supporting table and the shifting means drives the supporting table to move the carrying tray.

8. According to the process claimed in claim 7, wherein during the supporting table moving the carrying tray, a retractable engagement claw on the supporting table is used to position carrying tray.

9. A system for reading the barcodes on a plurality of cylindrical elements, comprising:
    a working table having a transferring path and an inspection area on the transferring path;
    a shifting means installed on the working table, which drives a plurality of the standing cylindrical elements to gradually move along the transferring path into the inspection area, wherein element barcodes are adhered on the outer walls of the cylindrical elements;
    a capturing means mounted above the inspection area to capture the cylindrical elements entering into the inspection area to a certain height;
    a transmission means disposed in the inspection area and coupled to the capturing means, which drives the cylindrical elements held by the capturing means at a certain height to self-rotate a certain rotation angle; and
    an element reader mounting in the inspection area, which reads the barcodes of the self-rotating cylindrical elements in order to identify and record the information of the cylindrical elements entered into the inspection area, wherein after the element reader reads the barcode, the capturing means transfer the cylindrical element from the certain height downwardly to an original position.

10. According to the system claimed in claim 9, wherein the transferring path is in a linear form.

11. According to the system claimed in claim 9, wherein the outer wall of the cylindrical element is a cylindrical surface, and one barcode is adhered on the cylindrical surface.

12. According to the system claimed in claim 9, wherein the cylindrical elements retain in a carrying tray and the shifting means drives the carrying tray to be moved along the transferring path.

13. According to the system claimed in claim 12, wherein the carrying tray is adhered a carrying-tray barcode, a carrying tray reader disposed on the transferring path is used to read the carrying-tray barcode of the carrying tray to identify and record the information of the carrying tray on the transferring path.

14. According to the system claimed in claim 12, wherein the shifting means provides a supporting table which can be moved along the transferring path, the carrying tray is positioned on the supporting table and the shifting means drives the supporting table to move the carrying tray.

15. According to the system claimed in claim 14, wherein a retractable engagement claw is disposed on one side of the supporting table, during the supporting table moving the carrying tray, the retractable engagement claw is used to position carrying tray.

16. According to the system claimed in claim 15, wherein a slot is disposed at one side of the carrying tray in order for the retractable engagement claw to plug into the slot for positioning the carrying tray.

* * * * *